Jan. 6, 1953    R. B. WALDER    2,624,318
PNEUMATIC SERVOMOTOR
Filed June 24, 1946    3 Sheets-Sheet 1
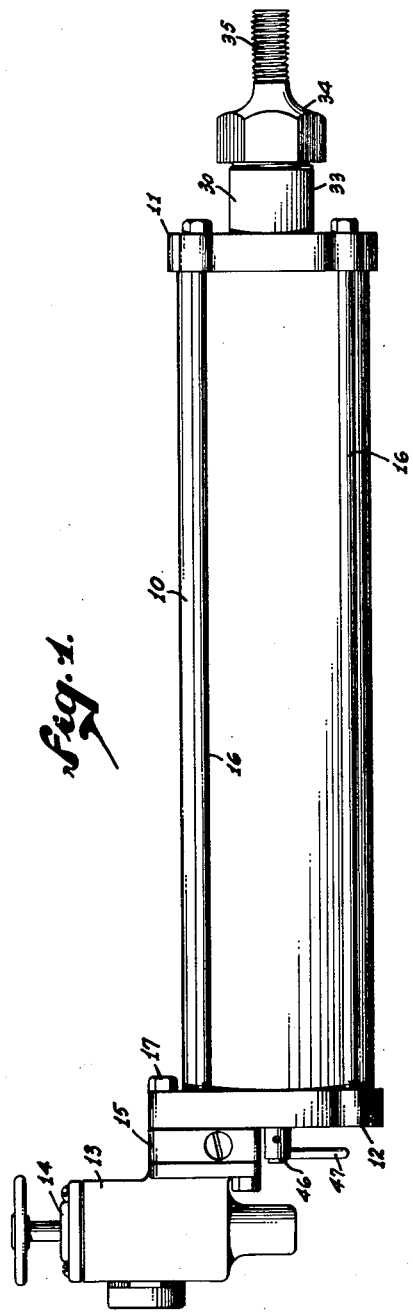
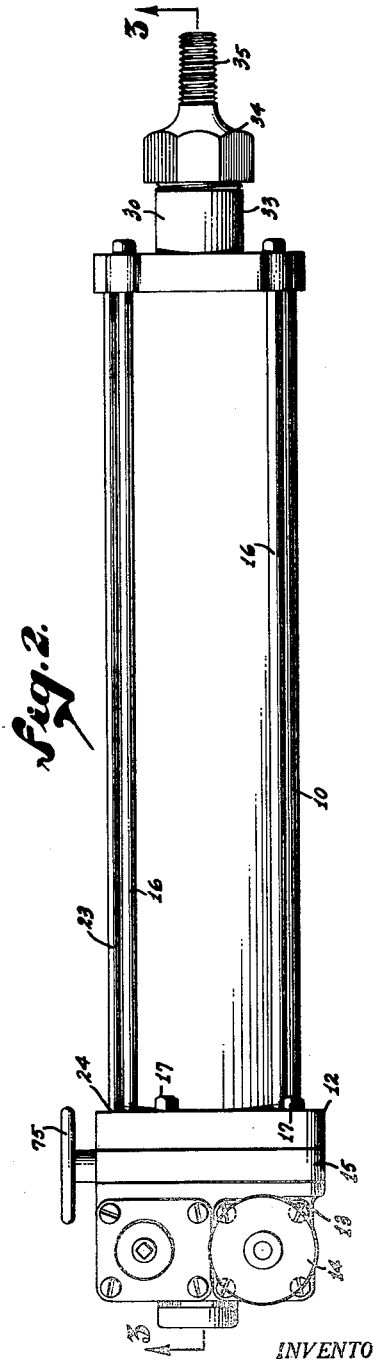
INVENTOR:
ROBERT B. WALDER.
BY Huebner, Maltby
and Beehler
ATTORNEYS.

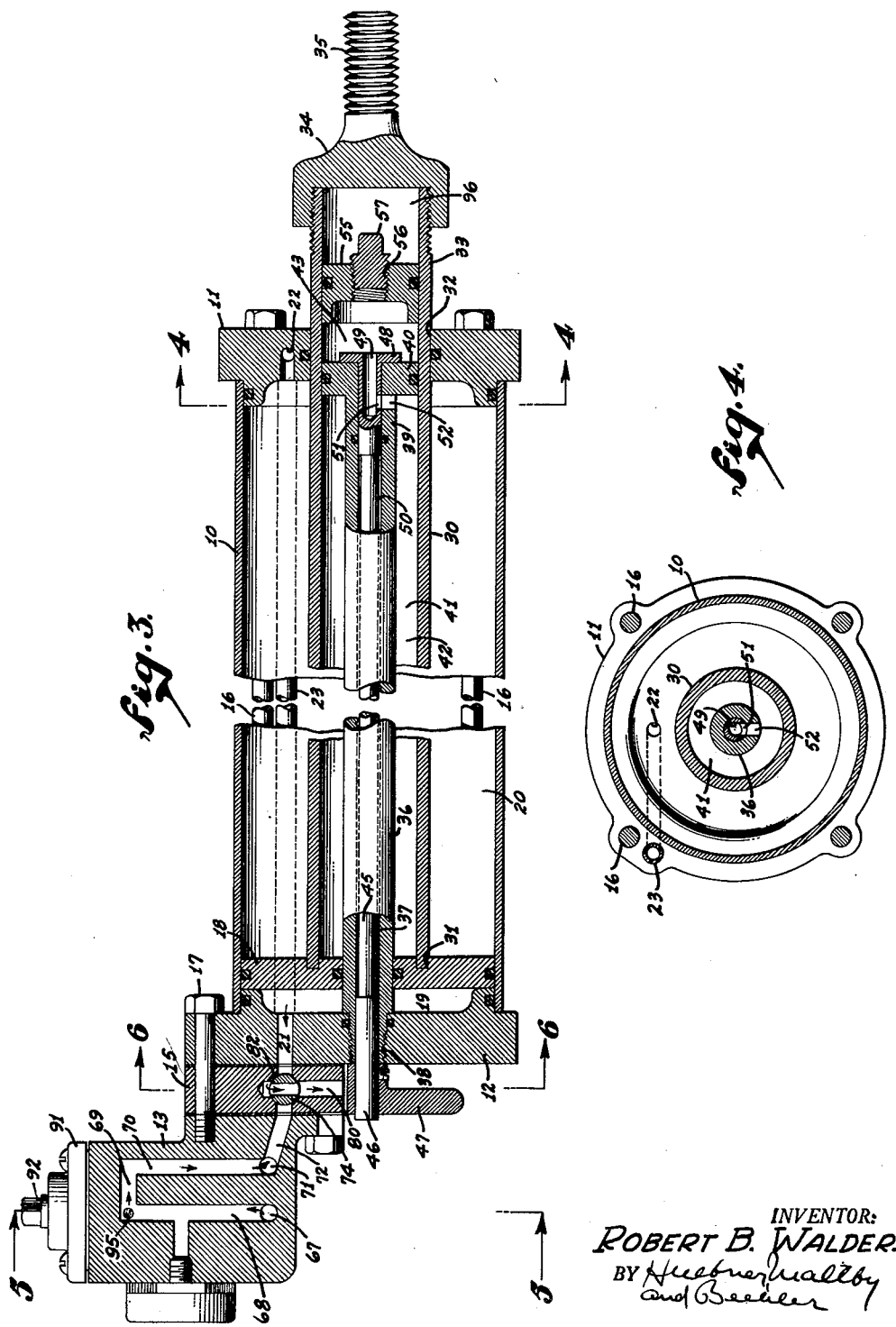

Jan. 6, 1953     R. B. WALDER     2,624,318
PNEUMATIC SERVOMOTOR
Filed June 24, 1946     3 Sheets-Sheet 3
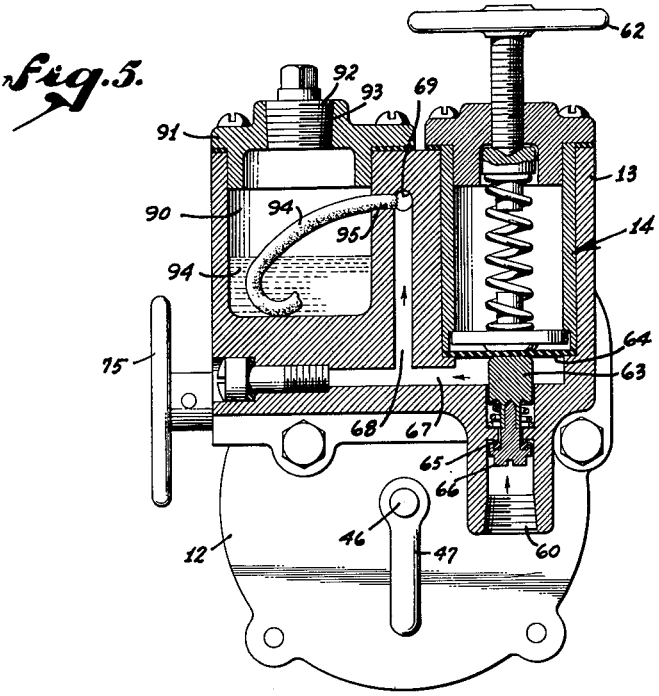
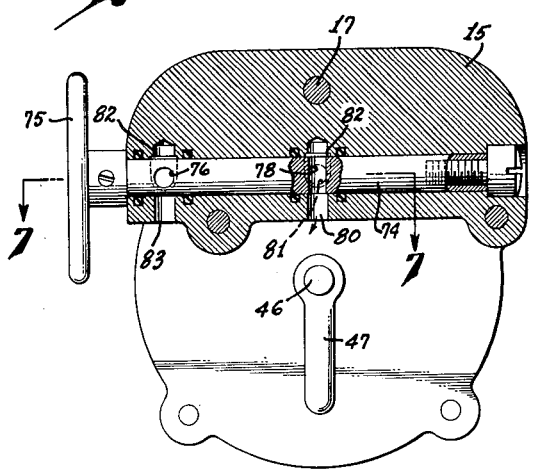
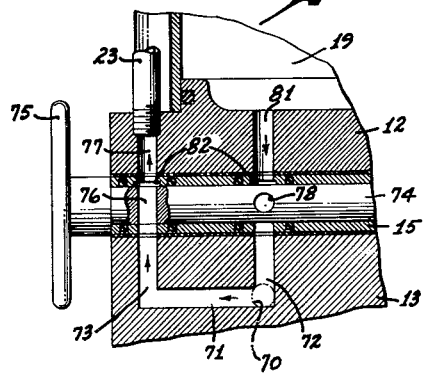
INVENTOR:
ROBERT B. WALDER.
BY Huebner, Maltby
and Biehler
ATTORNEYS.

Patented Jan. 6, 1953

2,624,318

UNITED STATES PATENT OFFICE 2,624,318

PNEUMATIC SERVOMOTOR

Robert B. Walder, Burbank, Calif., assignor, by mesne assignments, to Rheem Manufacturing Company, Richmond, Calif., a corporation of California Application June 24, 1946, Serial No. 679,027

5 Claims. (Cl. 121—45)

1

The invention relates to fluid operated pneumatic servomotors and has particular reference to a servomotor which is powered by one type of fluid and controlled as to its rate of movement with another separate fluid.

The device has particular value in machine tool work where either the work or the tool might need to be advanced at different, preselected rates of speed and then returned to an initial position either rapidly or slowly as occasion might require.

In the operation of machine tools a great many types of automatic feeds have been provided for advancing either the tool or work as the case may be. Mechanical movements which have been adopted have given acceptable performance when they are designed with the proper degree of precision. Without highly precise designing and machining there may be on occasions insufficient accuracy in the mechanical feed. Furthermore, when a high degree of accuracy is necessary, the mechanical feed in most cases is expensive. Also, on mechanical feeds it is not easy to provide a sufficiently inexpensive device by virtue of which the speed of the feed can be instantly changed during its course of travel in either direction or which is sufficiently versatile so that a change in speed can be set at any point along its travel.

It is, therefore, among the objects of the invention to provide a new and improved automatic feed which is inexpensive in its design and manufacture and in which is incorporated a high degree of precision in timing and movement.

Another object of the invention is to provide a new and improved hydraulic ram feed which is adapted to use one type of fluid pressure as a source of power and another fluid as a means of controlling the application of the power.

Still another object of the invention is to provide a combined set of cylinders, one capable of using a fluid pressure such as air pressure which might vary to a certain extent during any period of its use and another imprisoned fluid such as a hydraulic liquid with means provided for the control of flow of the hydraulic liquid sufficient to maintain the feed under predetermined control at all times and capable of varying the control at any stage of its cycle of operation.

A further object of the invention is to provide in a hydraulic ram an automatic means of supplying small quantities of lubricant to such portions of the device as are not lubricated in any way by hydraulic fluid within the device.

With these and other objects in view, the invention consists in the construction, arrangement and combination of the various parts of the device whereby the objects contemplated are attained, as hereinafter more fully set forth, pointed out in the claims and illustrated in the accompanying drawings, in which:

Figure 1 is a side, elevational view of an embodiment chosen to illustrate the invention.

Figure 2 is a plan view of the device shown in Figure 1.

Figure 3 is a side view in section taken along the center line of Figure 2.

Figure 4 is a cross-sectional view taken on the line 4—4 of Figure 3.

Figure 5 is a cross-sectional view taken on the line 5—5 of Figure 3.

Figure 6 is a cross-sectional view taken on the line 6—6 of Figure 3.

Figure 7 is a fragmentary, sectional view taken on the line 7—7 of Figure 6.

When operating such devices as machine tools where a high degree of precision is desirable and also where the force exerted during the operation may be great, mechanical feeds for either tool or work must not only be precise and positive but must also be of such rugged construction that the precision built into them may be maintained when heavy work is being done.

In many types of operation the feeding stroke must be slow so that cutting is not done at too great a rate of speed. If the machine is to operate efficiently without loss of time, the return stroke must be much more rapid than the feeding stroke. This means that power utilized in any feeding apparatus must be applied very slowly at one stage of the cycle of operation and very rapidly at another stage.

Also, in some operations a portion of the feeding stroke might be advantageously made at a faster rate than another portion of the same feeding stroke. To accomplish this the rate of feed would have to be changed at some point between the start and the termination and, in fact, might need to be changed several times, each time being changed to a different rate of speed.

A great deal of time could be saved in some machining operations if an inexpensive feeding apparatus could be made which could be applied to a machine tool in which precision operations are required. It is also highly desirable to be able to provide a feeding apparatus with the versatility of adjustment just described constructed in such a manner that the device could be added to any one of a wide variety of machine tools already in existence.

In the embodiment chosen to illustrate the invention air pressure is utilized as a source of power, and a hydraulic liquid is utilized as a means of controlling the application of power. It will be appreciated that air pressure, although attempted to be maintained at a constant pressure, is apt to vary in pressure to some extent during the course of the work day. Unless the device which is adapted to utilize the air pressure compensates for the difference in pressure, there may be a variation in the operation of the device at times when air pressure varies, often in spite of the fact that an air pressure regulator is incorporated into the air feed line. The heavier the type of work which is encountered the more variation is likely to be present.

The device herein described contemplates an abundant supply of air at all times which may not necessarily be controlled by an air pressure regulator. Under such condition the device is capable of precisely controlling the rate of application at all times by carefully controlling the rate of flow of imprisoned hydraulic fluid, the volume of which remains constant at all times but the location of which shifts during the course of operation.

In the particular apparatus selected to illustrate the application of the principle there is shown an outer cylindrical casing 10 having a cap or end plate 11 at one end and a corresponding cap or end plate 12 at the other end providing within the casing a chamber for air or other gas under pressure. At one end of the casing is a housing 13 in which may be located, if desired, an air pressure regulator 14. Between the housing 13 and the plate 12 may be interposed a block 15 within which is located a reversible air valve device, details of which are shown in Figures 3, 6 and 7.

Specifically, the casing 10 has its ends 11 and 12 bound together by tie rods 16. Bolts 17 extend through the plate 12 and block 15 into the housing 13 to secure all parts of the device together in order that they may function as a single unit. Suitable gaskets may be interposed between the various parts where needed.

As best seen in Figure 3, the casing 10 forms an air chamber which by means of a piston 18 is divided into portions 19 and 20. The chamber portion 19 is fed by an air inlet passage 21; whereas, the chamber portion 20 is fed by an air inlet passage 22 which through a tube 23 located exteriorly relative to the casing is connected at the point 24 to the air valve device within the block 15.

Concentrically disposed within the casing 10 is a second casing 30 herein comprising a hydraulic cylinder. The piston 18 is provided with an annular recess 31 adapted to receive one end of the casing 30 thereby forming a closure for the end. The casing 30 extends slidably through an aperture 32 in the plate 11 so that a portion 33 always protrudes outside of the end of the casing 10. In this embodiment a cap 34 is threadably disposed upon the end of the casing 30 closing the end, and the cap may be provided with some means such as an externally threaded boss 35 to which a tool or fixture may be secured. It will be apparent, also, that at all points where one casing slides with relation to the other and also at all points where there may be the possibility of leak past either static or moving joint sealing rings are provided.

Concentrically disposed within the inner casing 30 is still another element herein identified as a core member or rod 36 having a central bore 37 extending throughout its length. The rod has a threaded end 38 fixed immovably within the plate 12. At its other end 39 the rod is provided with a piston head 40 which is slidably located with respect to the wall of a hydraulic chamber 41 which, by means of the piston head, is divided into separate chamber portions 42 and 43.

Located inside of the bore 37 in the rod 36 is a valve stem 45 extending throughout the length of the bore and having a protruded portion 46 provided with a handle or lever 47 by means of which the valve stem may be rotated. The end of the valve stem opposite from the handle has attached thereto a valve element 48 which is provided with an axial passage 49 extending through the piston head 40, the valve element being nonrotatably attached to the valve stem. It will be noted that there is a space 50 throughout most of the length of the valve stem to provide a clearance in order to ease operation of the stem within the bore.

The valve element in addition to the passage 49 is provided with a laterally extending aperture 51 which communicates with a transverse valve passage 52 located in the wall of the rod 36. The chamber 41 is adapted to contain hydraulic fluid or liquid which during the operation of the device may pass from the chamber portion 42 to the other chamber portion 43 through the passages 52, 49 and the communicating aperture 51.

In the chamber portion 43 there is provided a floating piston 55 through which is a passage 56 closed by a plug 57. By removal of the cap 35 and plug 57 hydraulic liquid may be passed into the chamber 41.

In order to supply air as a source of power to the casing 10, there is provided an air inlet 60 through which compressed air passes to the air pressure regulator 14 of substantially conventional design which, by manipulation of a handle 62, is capable of adjusting a regulator valve element 63 through a diaphragm 64 and permit air to pass a valve seat 65 when a valve element 66 is open.

Air under pressure, regulated by the air pressure regulator, then passes through a horizontal air passage 67 upwardly through a vertical air passage 68 to an upper horizontal passage 69, thence downwardly through another vertical passage 70 to a transverse passage 71. From the transverse passage air under pressure moves through either a right-hand longitudinal passage 72 or a left-hand longitudinal passage 73 which feed, respectively, portions 19 and 20 within the casing 10, as viewed in Figure 7.

Flow of air under pressure to the casing 10 which comprises the air chamber is controlled by the position of a rotating air valve element 74 which is shifted to one position or another by means of a lever or handle 75 at the left-hand end, as viewed in any of Figures 5, 6 and 7.

In the position of the valve element 74, shown in Figure 7, air is being supplied to the chamber portion 20. It will be evident that the valve element 74 is rotated to such a position that a transverse port 76 is in alignment with the passage 73 and a passage 77 which communicates with the tube 23. In the same position of the valve element 74 a valve port 78, which is directed at right angles to the direction of the port 76, is closed against the air passage 72. In this position, however, the port 78, being in a vertical position, is adapted to communicate with an exhaust passage 80; hence, air from the air chamber portion 19 is adapted to pass through a passage 81, through a recess 82 to the upper end of the port 78 and thence through the port to the exhaust passage 80.

In a second position the valve element may be rotated so that air pressure is supplied to the air chamber portion 19 and exhausted from the air chamber portion 20. This requires a rotation of the valve element 90° so that the valve port 78 is in communication with the passages 72 and 81, and the transverse port 76 is then vertically disposed, shutting off flow from the air passage 73 and providing communication between the passage 77, a recess 82 and a second exhaust passage 83.

In order to provide a constant source of lubrication for the piston 18 and other sliding surfaces communicating with the air chamber, there is provided a lubricant well 90 which is vertically positioned within the housing 13. The well is adapted to be closed by a cap 91 fastened in place by suitable screws and a gasket and having a plug or cap 92 closing a filling aperture 93 in the cap. A lubricant 94 is adapted to be contained within the well.

Also located in the well is a wick 94 which extends through a hole 95 in the wall of the well 90 near the top so that the hole is in communication with the vertical air passage 68 at the point where it communicates with an upper passage 69. The wick is capable of soaking up a limited amount of lubricant and presenting it to air which travels through the air inlet passages on its way to the air valve element and the air chamber.

In operation, air under pressure is applied to the air inlet 60. Assuming the valve element 74 to be in the position shown in Figures 6 and 7, air under pressure will be passed through the tube 23, the passage 22 and thence into the chamber portion 20. When the piston 18 is in the position shown in Figure 3, the device will remain in fixed position. Let it now be assumed that the valve element 74 is rotated 90° so that air from the air chamber portion 20 is exhausted through the passage 77 and exhaust passage 83. At the same time air under pressure will pass from the passage 72 through the port 78 and passage 81 to the air chamber portion 19. This will exert a pressure upon the left-hand face of the piston 18, and the piston will be driven from left to right, as viewed in Figure 3.

At the same time, hydraulic liquid will pass from the hydraulic chamber portion 42 through the passages 52, 51 and 49 into the hydraulic chamber portion 43. Regardless of how great the pressure may be, the rate of movement of the piston 18 will be determined by the rate of flow of hydraulic fluid from one hydraulic chamber portion to the other. The rate of flow will be governed by the joint resistance of the passages 52, 51 and 49 to the flow of fluid. This resistance can be varied by rotating the valve element 48 by means of the stem 45 and handle 47. Rotation of the valve element is adapted to move the aperture 51 into different positions of adjustment so that it is closed a relatively greater or smaller amount depending upon the desired adjustment.

By this device the rate of flow of hydraulic liquid may be so retarded that the piston 18 and attached cylinder casing 30 is capable of moving only at a very slow rate. It may, however, be opened wider so that the casing moves at any faster rate limited only by the full open capacity of the valve. The valve element 48 may be manipulated so as to control flow of hydraulic liquid while the piston 18 and casing 30 moves either in a left or right direction or a direction from right to left, thus either the advance stroke or the retreating stroke may be slowed down or controlled at will. At the end of the stroke, or in fact at any intermediate point, if desired, the lever or handle 75 may be tripped so as to reverse the direction of air to the air chamber and thus reverse direction of movement of the casing 30.

Of importance to operation of the hydraulic cylinder is the floating piston 55. It will be noted that the mid-portion of the hydraulic chamber 42 is occupied by a substantial portion of the core member or rod 36. In the hydraulic chamber 43 there is nothing to occupy any space other than the hydraulic liquid itself; hence, for movement of a given distance of the casing 30 from left to right, for example, the volume of the chamber 42 would normally be decreased an amount substantially in excess of the volume of space in the hydraulic chamber 43 if the piston 55 should remain in fixed position.

In order that the two chambers may cooperate with each other and vary in volume at the same rate, the piston 55 is permitted to float or shift from right to left or from left to right as may be required so as to compensate for what would otherwise be a difference in the rate of change of volume.

For example, let it be assumed that with the apparatus in the position illustrated in Figure 3 the aggregate volume of the chambers 42 and 43, including the passages 49, 51 and 52 is, for example, 20 cc. Let us now temporarily fix the piston 55 with relation to the casing 30 and extend the casing 30 to the right as far as it will go. This will place the piston 18 at the extreme right end of the casing 10 in Figure 3. Let us suppose that now we find the aggregate volume of the chambers 42 and 43 including the passageways to be 30 cc. The 10 cc. difference we readily see is due to the volume of the rod 36 when it occupies the interior of the casing 30.

Under the assumption above hydraulic liquid is placed in the casing 30 by first extending the casing 30 to the maximum volume position, i. e., as far to the right as it will go. Cap 34 and plug 57 are removed and 20 cc. of hydraulic liquid are placed in the chambers 42 and 43. The piston 55 is then pushed inwardly until no air space is left in the chambers 42 and 43, and the plug 57 is replaced. Under this circumstance the chamber 96 will have its maximum volume. Cap 34 is then replaced and the device is ready for operation.

When casing 30 is moved to the left in Figure 3, liquid is steadily forced from the chamber 43 into the chamber 42. Because of the fact that the cross section of chamber 42 is less than that of chamber 43, the former will be unable to accept the liquid as rapidly as it must leave chamber 43. This forces the piston 55 to the right (relative to casing 30) ensmalling the chamber 96 by compressing the air therein. At the end of the leftward stroke of casing 30 the apparatus will be in the position shown in Figure 3. Chamber 96 will be at its minimum volume and the pressure therein will be at its maximum. During the process, the chamber 96 will have reduced in volume by 10 cc. represented by 30 minus 20, i. e., the difference in volume of the chambers 42—43 at the two extremes in position of the casing 30. It is to be understood that the volumetric figures employed above are purely illustrative and have no practical foundation in the actual structure.

It will be appreciated, of course, that depending upon the type of machine tool upon which the invention described herein is mounted appropriate cams and levers may be designed and utilized to trip both the air valve element and the hydraulic valve at any appropriate time and position. A suitable design of cams will permit use of the air powered, hydraulic controlled ram of the invention under a wide variety of circumstances where different rates of speed may be desired to be combined in a feed for tool or work.

The cycle of operation may likewise be varied by reversing the air flow at any time. Other characteristics of the device may be utilized by changing, for example, the type of hydraulic fluid or the size of the various passages and valves in the device.

Construction of the entire apparatus in three separate units as, for example, by utilizing a device such as the block 15 between the housing 13 and the casing 10, makes it possible to machine the various parts of the device with considerable ease and to assemble them together quickly and efficiently. Parts are thus interchangeable and easy to maintain and to keep in proper working order. Moreover, by providing efficient internal lubrication the working parts are always maintained in a suitable lubricated condition so that constant attention to the moving parts is unnecessary.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent structures.

The invention having been herein described, what is claimed and sought to be secured by Letters Patent is:

1. A servomotor comprising a housing defining a cylindrical chamber with end walls, a piston disposed within said chamber and adapted for reciprocal movement therein, a second cylindrical housing and being formed with a passageway cured to said piston concentric therewith and adapted to reciprocate with said piston, said second cylindrical housing extending through one end wall of the first-named housing, a second piston positioned within said second cylindrical housing containing damping fluid and being se-communicating from one side to the other, said second piston being held motionless by a stationary connecting rod extending through the first-named piston and connected to the other end wall of the first-named housing, a movable wall disposed with at least one side communicating with said second cylindrical housing on the side of said second piston opposite said connecting rod and adapted to compensate for volumetric differentials, said second cylindrical housing having at its outer end a removable cap for providing access to the interior thereof, and a means on said cap to which a tool or fixture may be secured.

2. Apparatus according to claim 1 wherein said movable wall consists of a floating piston reciprocable in said second cylindrical member.

3. Apparatus according to claim 2 wherein said second cylindrical member is closed by a transverse wall forming an air chamber opposite said floating piston, compression of the air constituting a bias tending to urge said floating piston towards said second piston.

4. Apparatus according to claim 1 having means for biasing said wall toward the chamber in said second cylindrical member with which said wall is in communication, thereby tending to ensmall the volume of said chamber.

5. A servomotor comprising a housing defining a cylindrical chamber having end walls, a piston reciprocally disposed in said chamber adapted to be positioned by a pressure differential across its faces, a reciprocable housing disposed in said chamber concentric therewith and adapted to reciprocate with said reciprocable piston, said reciprocable housing extending through one end wall of the first-named housing, a stationary piston disposed in said reciprocable housing, said stationary piston being held by a stationary bored connecting rod extending through the first-named piston and connected to the other end wall of the first-named housing, a conduit communicating between opposite sides of said stationary piston, said conduit having an adjustable valve orifice, a compensating piston disposed in said reciprocable housing on the side of said stationary piston opposite from said piston rod adapted to freely float and compensate for volumetric differentials, means for directing a flow of fluid under pressure to either side of said first-named piston, a control rod extending through said piston rod bore and adapted upon rotation to adjust said valve orifice, said reciprocable housing having at its outer end a removable cap for providing access to the interior thereof, and a means on said cap to which a tool or fixture may be secured.

ROBERT B. WALDER.

REFERENCES CITED

The following references are of record in the file of this patent:

UNITED STATES PATENTS

| Number | Name | Date |
|---|---|---|
| 789,566 | Riddell | May 9, 1905 |
| 897,676 | Thompson | Sept. 1, 1908 |
| 1,594,944 | Hansen | Aug. 3, 1926 |
| 1,824,833 | Nordberg | Sept. 29, 1931 |
| 1,825,233 | Joyce | Sept. 29, 1931 |
| 1,832,618 | Conklin | Nov. 17, 1931 |
| 2,314,404 | Katcher | Mar. 23, 1943 |
| 2,365,247 | Carlton | Dec. 19, 1944 |

FOREIGN PATENTS

| Number | Country | Date |
|---|---|---|
| 1,667 | Australia | of 1931 |